United States Patent
Hattersley et al.

(10) Patent No.: US 6,352,204 B2
(45) Date of Patent: *Mar. 5, 2002

(54) OPTICAL SYMBOL SCANNER WITH LOW ANGLE ILLUMINATION

(75) Inventors: John R. Hattersley, Skaneateles; Francis O. Blackwell, III, Auburn, both of NY (US)

(73) Assignee: Industrial Data Entry Automation Systems Incorporated, Skaneateles, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,414

(22) Filed: Aug. 4, 1999

(51) Int. Cl.[7] ................................................. G06K 7/10
(52) U.S. Cl. ................................. 235/472.01; 235/454
(58) Field of Search ...................... 235/462.06, 472.01, 235/459, 480, 454

(56) References Cited

U.S. PATENT DOCUMENTS

| | | | | |
|---|---|---|---|---|
| 3,726,998 A | * | 4/1973 | Szpak et al. .................. 178/7.6 |
| 3,918,028 A | * | 11/1975 | Humphrey et al. ... 340/146.3 F |
| 4,128,298 A | * | 12/1978 | McMillan ................... 350/96.1 |
| 4,232,219 A | * | 11/1980 | Yamaoto et al. ............. 250/227 |
| 5,149,948 A | | 9/1992 | Chisholm ..................... 235/462 |
| 5,177,346 A | | 1/1993 | Chisholm ..................... 235/462 |
| 5,399,852 A | * | 3/1995 | Zheng et al. ................ 250/225 |
| 5,406,060 A | | 4/1995 | Gitin ............................ 235/462 |
| 5,481,101 A | * | 1/1996 | Yoshida ....................... 235/472 |
| 5,569,902 A | * | 10/1996 | Wood et al. ................. 235/472 |
| 5,572,006 A | * | 11/1996 | Wang et al. ................. 235/454 |
| 5,586,212 A | * | 12/1996 | McConica et al. .......... 385/146 |
| 5,619,029 A | * | 4/1997 | Roxby et al. ................ 235/472 |
| 5,656,803 A | * | 8/1997 | Seo .............................. 235/472 |
| 5,786,586 A | * | 7/1998 | Pidhirny et al. ............. 235/472 |
| 5,844,228 A | * | 12/1998 | Nukui et al. ................. 235/472 |
| 5,859,418 A | * | 1/1999 | Li et al. ....................... 235/472 |
| 5,923,022 A | * | 7/1999 | Penn et al. ............. 235/462.08 |
| 5,959,283 A | * | 9/1999 | Tawara et al. ......... 235/462.01 |
| 5,992,746 A | * | 11/1999 | Suzuki ................... 235/462.08 |
| 6,006,990 A | * | 12/1999 | Ye et al. ...................... 235/454 |
| 6,033,090 A | * | 3/2000 | Seo .............................. 362/252 |
| 6,247,645 B1 | * | 6/2001 | Harris ......................... 235/454 |

FOREIGN PATENT DOCUMENTS

JP          2001-34702      *    2/2001

* cited by examiner

Primary Examiner—Michael G. Lee
Assistant Examiner—Diane I. Lee
(74) Attorney, Agent, or Firm—Bernhard P. Molldrem, Jr.

(57) ABSTRACT

An optical symbol scanner assembly includes an illumination assembly to facilitate detection and decoding small 2-D matrix bar code symbols or other optically read symbols that are laser etched or printed on the surface of microelectronics modules or other small articles. A hand-held scanner has an array of LEDs or laser diodes on its distal face that produces light to illuminate the symbol. There is also a focussing lens on the distal face and an imager device positioned behind the lens. The illumination assembly is mounted on the distal face of the scanner device. In this assembly, a lens barrel member has an optic axis aligned with the optic axis of the scanner, and a light pipe is positioned adjacent the lens barrel member. The light pipe has a flat proximal face against the array of LEDs, and an angulated distal face for projecting the illumination at a sharp angle relative to the optic axis. The tip of the illumination assembly is in near contact with the article to read the symbol. The lens barrel member may carry an auxiliary lens. Preferably, there is a pair of light pipes disposed on opposite sides of said lens barrel member. Alternatively, the scanner may be configured as a fixed device, for reading symbols on articles that flow past it without contact.

17 Claims, 4 Drawing Sheets

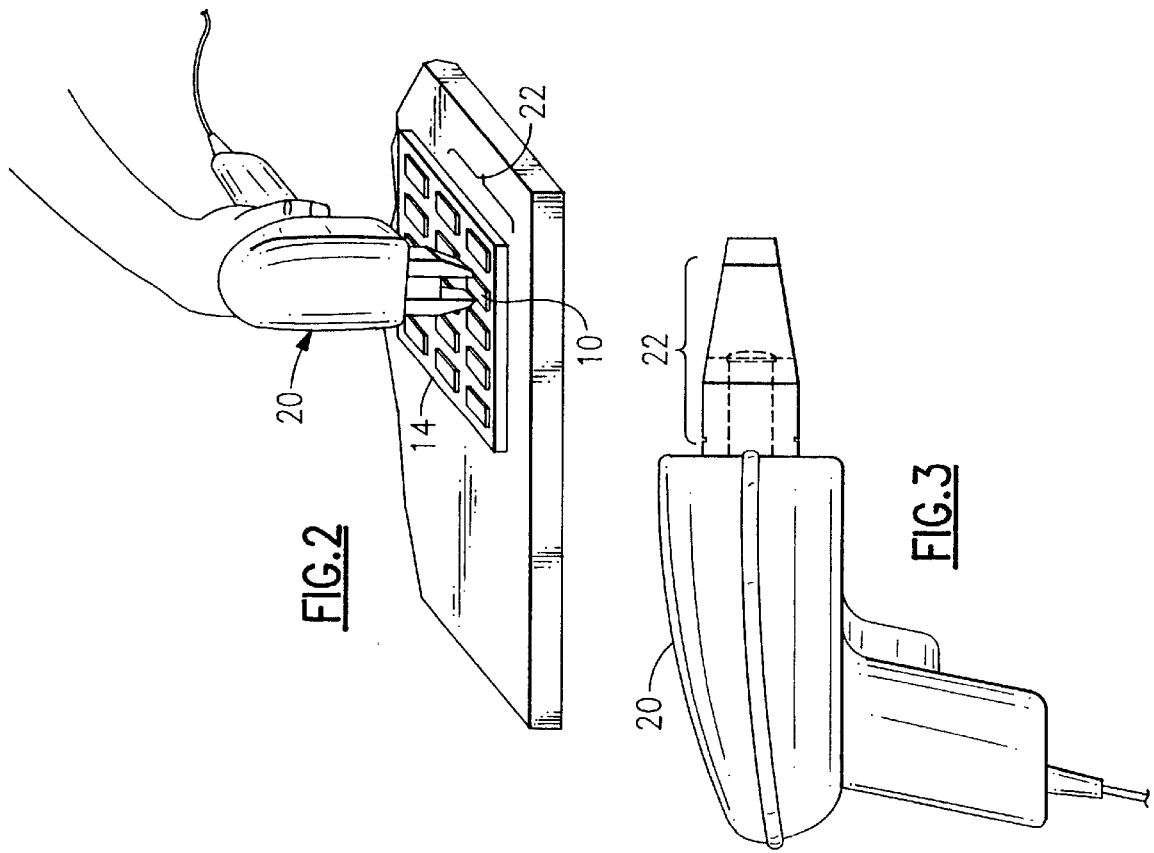
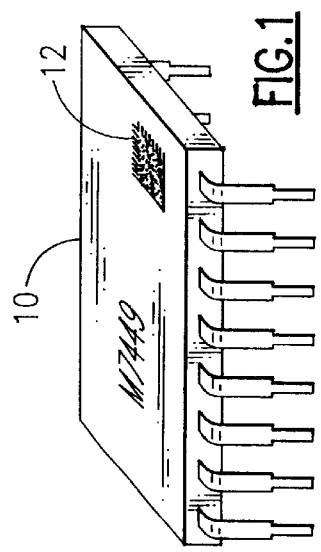
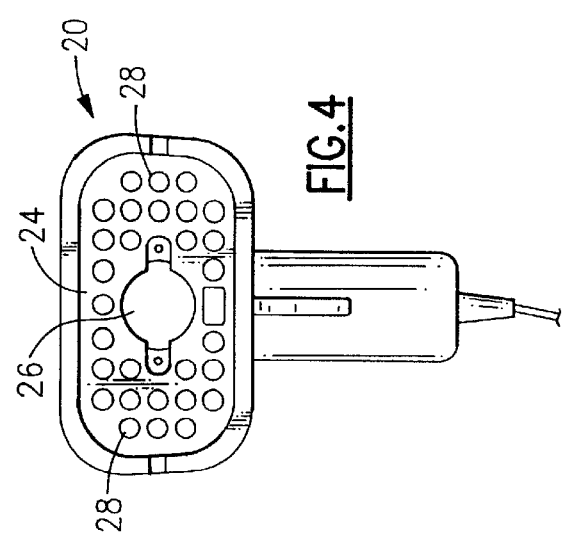

OPTICAL SYMBOL SCANNER WITH LOW ANGLE ILLUMINATION

BACKGROUND OF THE INVENTION

This invention is directed to the scanning devices, such as bar code scanners, and is more particularly concerned with an arrangement for reading optical symbols, e.g., small two-dimensional bar code symbols, such as may be used to identify the part number and serial number of an electronic module or the like. The invention is more particularly concerned with a device that is combined with an illuminator for shining light on the bar code symbol or other symbol to enhance the visibility and detectability of the readable matter that constitutes the symbol.

Recently, two dimension bar code systems have begun to be employed on small articles so that the article can be tracked thought a manufacturing process. For example, two dimensional bar code symbols are inscribed onto electronic parts, such as integrated circuits and printed circuit boards. Because of the high information density of the 2-D symbols, these can carry the part number, part serial number, and manufacturing history of the part, such as the place and date of manufacture, and all in a square that may be as small as three millimeters on a side. The symbols can be screen printed, ink jet printed, or laser-etched directly onto the top surface or the case of the device or part. However, in order to read the bar code easily on the first attempt, the illumination should impinge on the bar code symbol in a way that fully illuminates it but avoids flare from specular reflection. Unfortunately, current 2-D bar code scanners do not have any way of illuminating the bar code symbol at a low angle relative to the surface where it is inscribed, while the optic axis of the reader is oriented normal, i.e., substantially perpendicular to that surface.

Because of the small size of 2-D bar code symbols, the symbols can be difficult for the scanner to interpret where the lighting is uneven or if the contrast is too low. For example, Datamatrix™ bar code, which has been selected as the EIA (Electronics Industry Association) standard for small parts marking, is in the form of a matrix of bars about three millimeters on a side. These are inscribed by laser etching onto the plastic or ceramic housing or package for the electronic module, or can be printed by an ink jet technique. In either event, if the lighting is such that the scanner picks up specular reflection, the bar code symbol will produce a wash out, and may take several attempts to obtain a valid reading. Consequently, current bar code scanners have had some difficulty in obtaining bar code data in industrial processes where the small parts are to be identified from these very small bar code symbols.

OBJECTS AND SUMMARY OF THE INVENTION

Accordingly, it is an object of this invention to provide an improved illumination arrangement for a optical symbol scanning device that avoids the drawbacks of the prior art.

It is another object to provide bar code scanner and low angle illuminator arrangement that permits rapid and accurate reading of small, high density bar code symbols.

It is a further object to provide a hand-held scanner and illuminator that permits a user to read and accurately decode a symbol on an article by contact with the article.

It is still a further object to provide an illuminator for a hand-held 2-D bar code scanner that can be incorporated into the working or distal face of the scanner and which provides low angle illumination at the proper contact location to illuminate the bar code symbol.

It is yet a further object to provide a fixed bar code scanner arrangement for identifying bar-coded parts that stream past, and which incorporates a low angle illuminator.

According to one aspect of this invention, a scanner assembly is configured for detecting and decoding a small-scale two-dimensional optical symbol, such as a 2-D bar code symbol, lying on a surface of an electronic module or other article. The scanner assembly can be a handheld contact device, or can be a fixed (i.e., machine-mounted) device that reads the bar code symbols on articles that flow past it. The scanner assembly includes a low-angle light delivery system that focuses the light from the scanner to the precise point where the light is needed, and at an angle at which problems from specular reflection are considerably reduced. This provides an improved contrast ratio and achieves quicker, more successful decoding. This is especially useful wherever very small bar code symbols are applied directly to the surface of the part, e.g., by ink-jet or screen printing, by peening, or by laser etching. These symbols characteristically have a low contrast ratio, and are not easy to read and decode where a conventional illumination system is used. However, the low angle light delivery system employed here optimizes the readability by concentrating the lighting on the target bar code symbol at a sharp angle. The readability can be further enhanced by magnifying the symbol. The angle at which the light strikes the surface of the article minimizes the "wash out" effect caused by shiny or irregular surfaces.

In one preferred embodiment, a portable, hand-held scanner device is employed, having a distal face on which is positioned a light-generating means for producing illumination to fall on the bar code symbol. This is oriented to shine distally. An objective lens or other focusing means focuses an image of the bar code symbol on an imager, e.g., a charge-coupled device (CCD) or a charge-injection device (CID) that is positioned proximally of the lens in the housing of the scanner device. Here, the focusing means defines an optic axis for the scanner. A low angle light delivery system is adapted to be mounted on the distal face of the scanner device. This may include a lens barrel having an optic axis aligned with the optic axis of said scanning device, and carrying a lens, e.g., at its distal end. The lens may be omitted from the lens barrel in some designs. There are at least one light pipe, and preferably a pair of light pipes sandwiching the lens barrel between them. The light pipes have a flat proximal face to receive illumination from the light-generating means and an angulated distal face for projecting the illumination at a sharp angle relative to the optic axis. Here, the scanner arrangement is configured as a contact scanner and is to be positioned with the distal tip of the light pipe or pipes against the bar code symbol. In that position, the light from light delivery system impinges on the bar code symbol at a low angle relative to the surface of the article, while the optic axis of the scanner is substantially normal to the surface of the article.

In another preferred embodiment, the bar code scanner assembly can be configured for fixed scanning applications. In such case, the lens and imager are contained in a housing that is mounted in a fixed position, with associated electronics also carried withing the housing. The lens and imager define an optic axis. In this embodiment, the light delivery system involves an array of LEDs, laser diodes, or the like mounted in the housing at a position offset from the optic axis, angled so that the light crosses the optic axis at a sharp angle, e.g., 60–75 degrees. The parts to be scanned can pass beneath the scanner assembly on a plane at which the image of the bar code symbols will be in focus. When the bar code symbols are positioned at the optic axis of the scanner device, the illumination impinges the symbols at a low angle, e.g., 15–30 degrees, for optimal reading and decoding.

Illumination is not limited only to light in the visible spectrum, but may be infrared or other wavelengths.

The above and many other objects, features, and advantages of this invention will present themselves to persons skilled in this art from the ensuing description of preferred embodiments of this invention, as described with reference to the accompanying Drawing.

BRIEF DESCRIPTION OF THE DRAWING

FIG. 1 is a perspective view of an article carrying a two-dimensional bar code symbol.

FIG. 2 is a perspective view illustrating the reading of the bar code symbol employing a bar code scanner with a low angle illumination attachment according to an embodiment of this invention.

FIG. 3 is a side view of the scanner and illumination attachment of this embodiment.

FIG. 4 is a front view of the scanner, with the attachment removed.

DETAILED DESCRIPTION OF THE PREFERRED EMBODIMENT(S)

Figure 5:
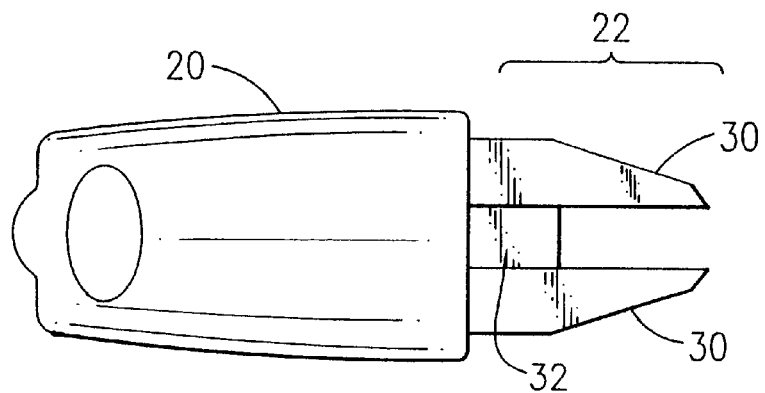
FIG. 5 are is a top view of the scanner and illumination attachment.

With reference to the Drawing, FIG. 1 shows an electronics module 10, e.g., an integrated circuit, with a small, two-dimensional bar code symbol 12 carried on the top surface of its case or housing. In this case, the bar code symbol 12 can be a matrix symbology, such as DataMatrix, or alternatively, Maxicode, PDF417, Aztec, or another protocol. Alternatively, a linear bar code, full-size to ultra-small, can be used, such as Codabar, UPC, or another symbology. The bar code symbol makes it possible to read automatically the part number, part serial number, manufacturing history, and other important data about the module 10 during various manufacturing stages, or later on during the product life, e.g., for warranty purposes. However, because of the small size of the bar code symbol 12, the same is often applied directly onto the surface of the module 10 by a laser etch technique, by a peening technique, or by an ink jet printing technique. In either case, low contrast and specular reflection of the illumination can make it very difficult to read the symbol. To this end, it has been desired to enhance the detectability (i.e., readability) of the symbol 10, especially where it has been laser etched on the surface. Because laser etched areas are more visible when illuminated at a high incidence angle relative to the normal, the technique of this invention has been developed to illuminate the article such that the axis of illumination is at a small angle relative to the etched surface. On the other hand, the optical axis of the scanner is held at or near the normal, i.e., perpendicular, to the surface.

Alternatively, the scanner 20 may be adapted to decode other symbols, or may read text as an optical character reader, or may reproduce images on the surface of the article.

FIG. 2 shows a technique for reading the symbols on integrated circuit modules 10 that have been mounted on a printed circuit board 14. Here, a hand-held two-dimensional bar code scanner 20 is employed, and which carries a low angle illumination attachment 22 according to an embodiment of this invention. The combination scanner and illumination attachment of this embodiment is designed as a contact scanner arrangement, with the tip of the illumination attachment 22 being held against the module 10 or other part to illuminate the symbol 12 at a low angle, such as 15° relative to the surface of the module 10. At the same time, the optic axis of the scanner 20, i.e., the proximal-distal axis, is perpendicular or within some range of perpendicular to the bar code symbol 12.

FIG. 3 shows, generally, the scanner and illumination attachment, with the attachment 22 fitted into the distal face of the scanner 20. The attachment 22 in this embodiment is made of a pair of clear plastic light pipes and an auxiliary lens arrangement sandwiched between them. The auxiliary lens arrangement brings the image of the bar code symbol into proper focus when the symbol 12 is positioned at the distal tip of the illumination arrangement.

FIG. 4 shows the distal, or working face 24 of the hand held scanner 20. There is a focussing lens 26 at the central part of this face 24, with a CCD or other imager positioned behind it. On either side of these there are arrays 28, 28 of LED's, laser diodes, or similar devices. In the standard scanner device, the LEDs are configured to send light forward, i.e., distally, generally parallel to the optic axis defined by the lens and CCD of the scanner.

Figure 6:
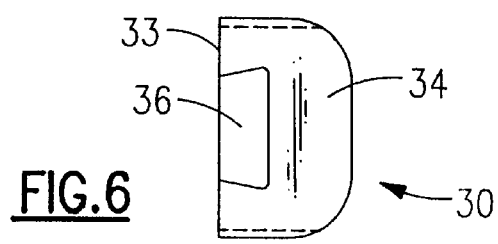
FIGS. 6 to 8 are a distal end view, a top view, and a side view of the light pipe employed in this embodiment.
Figure 7:
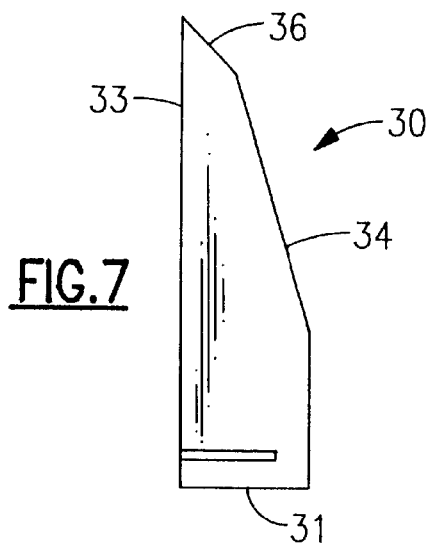
Figure 8:
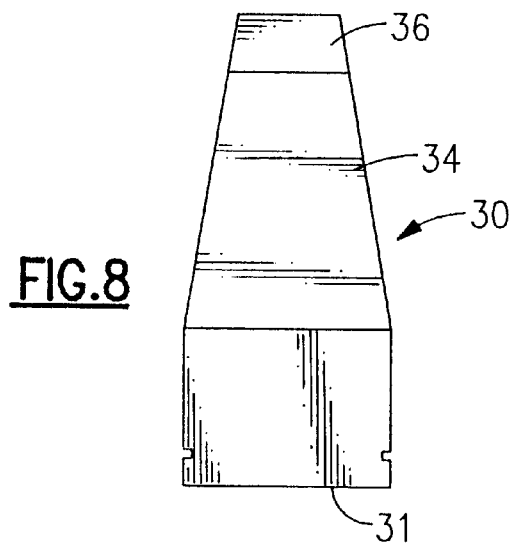

As shown in FIG. 5, the attachment 22 comprises a pair of light pipes 30 with a light barrel member 32 between them. Each of the light pipes 30 is positioned over one set or array of LEDs 28, and the lens barrel member 32 is aligned with the optic axis of the scanner 20. As shown in FIGS. 6, 7, and 8, each of the light pipes 30 has a flat base surface 31 that fits flush against the respective LED array, and a flat inward facing side 33 disposed parallel to the scanner optic axis. The light pipe 30 is tapered on its outward facing sides so that it has an angulated middle portion 34 that assists in concentrating the light to the tip, and a tip portion 36 that is angled at about 40° relative to the flat inward wall 33. Light is internally reflected in the light pipe, and exits at the tip at an angle of 10° to 18° relative to the plane of the bar code symbol, i.e., about 72° to 80° relative to the optic axis. Furthermore, because of the taper between back and front, the light is concentrated as it travels to the tip of the light pipe so that the light is much brighter on the region of interest, i.e., the bar code symbol 12.

Figure 9:
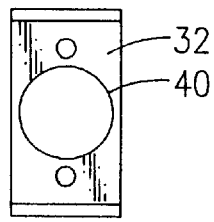
FIGS. 9 and 10 are a distal end view and a top view of the lens barrel member employed in this embodiment.
Figure 10:
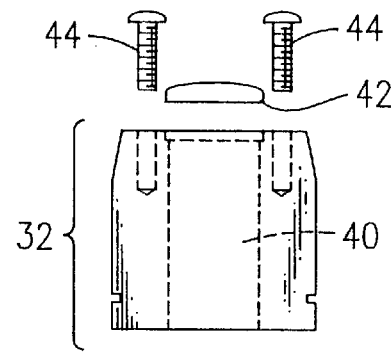

As shown in FIGS. 9 and 10, the lens barrel member 32 has square sides that mate against the inward surfaces 33 of the associated light pipes 30. A bore or tunnel 40 through the member 32 carries an auxiliary lens 42, which can be fitted into a recess at the distal end of the bore. Here, the lens 42 is a plano-convex focussing lens of 60 mm focal length and a 12 mm diameter. Screws 44 which fit openings in the member 32 hold the lens 42 in place.

Figure 11:
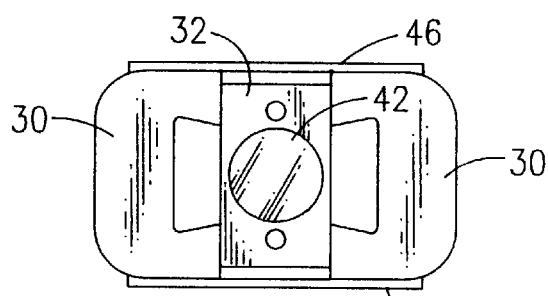
FIGS. 11 to 13 are a distal end view, a top view, and a side view of the illumination attachment of this embodiment.
Figure 12:
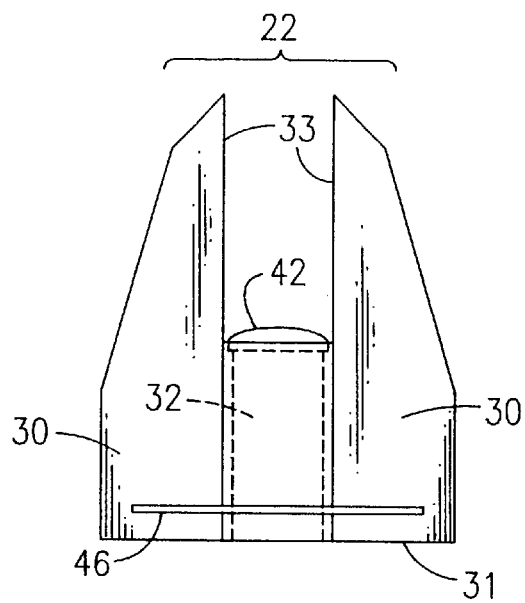
Figure 13:
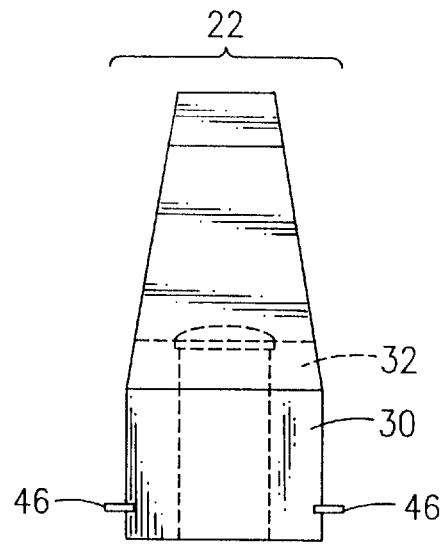

The illumination assembly 22 is then configured as shown in FIGS. 11, 12, and 13, where the two light pipes 30 are bonded to the lens barrel member 32. There is an open space between the light pipes 30 distally of the lens barrel member 32. Also shown here are a pair of metal ribs 46 that are inserted into cooperating recesses in the light pipes 30 and lens barrel member 32. These ribs 46 mate with cooperating structure on the distal face of the scanner 20 to hold the assembly 22 in place.

The light pipes 30 of this embodiment are made of a clear acrylic material, although other materials could be used. Also, the light pipes could be hollow tubes, rather than solid members. Also, there may be more than two light pipes, or the device may employ only a single light pipe, depending on the application.

Figure 14:
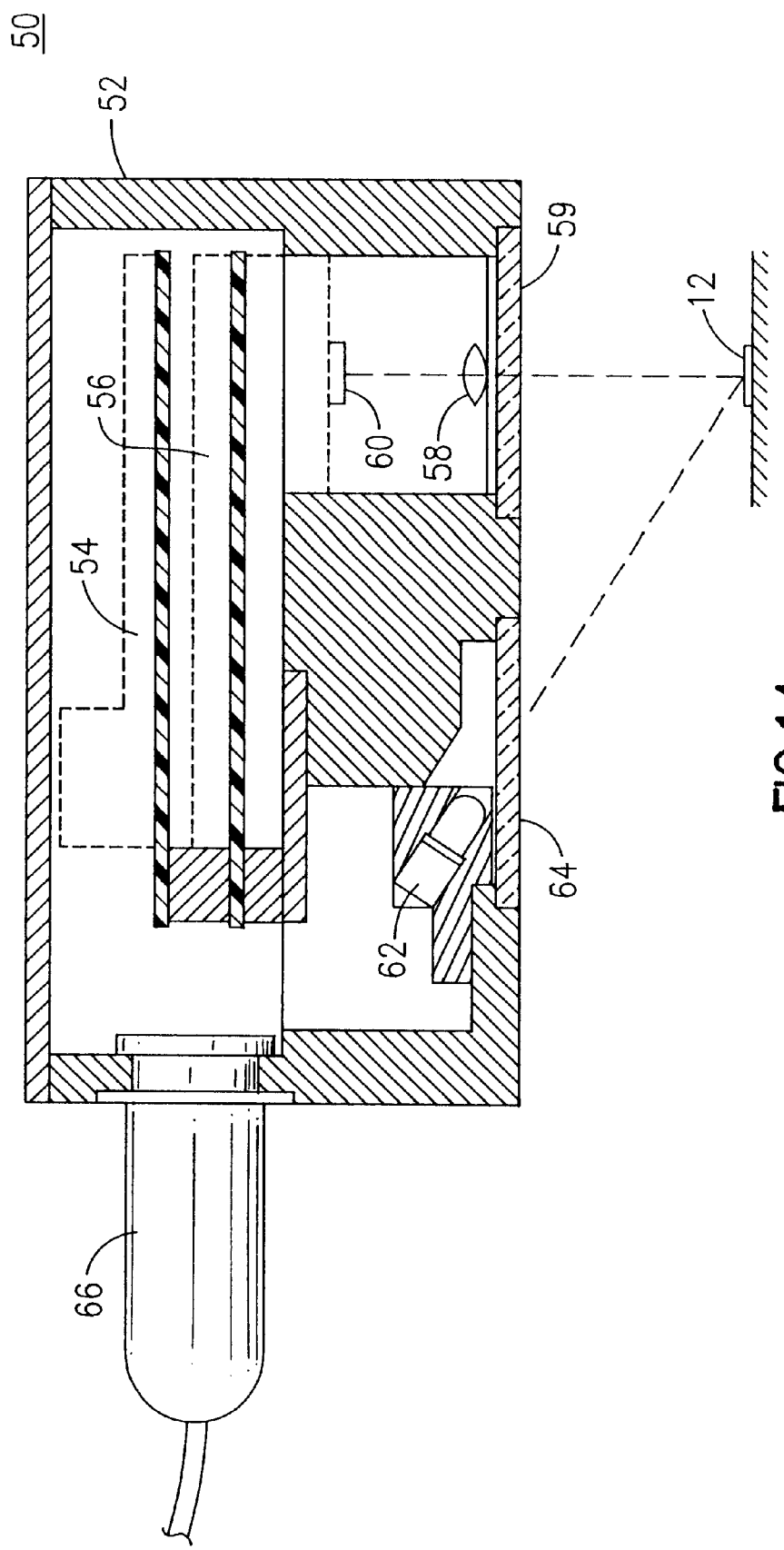
FIG. 14 is a sectional view of a scanner with low angle illumination arrangement according to another embodiment.

FIG. 14 shows an embodiment of this invention in which a bar code scanner 50 is fixed in an environment, for example, above or below a line or conveyor on which bar-coded products move past the scanner for identification. Here, the scanner has an aluminum housing 52 containing electronics circuit boards 54 and 56 mounted within it. A focusing lens 58 is positioned adjacent a window 59 in the housing, and a CCD imager module 60 is positioned behind the lens 58, the imager module 60 and lens 58 defining an optic axis for the scanner 50, which in this view is vertical. The lens 58 focuses images of bar code symbols 12 that are located on this axis in a plane below the window 59. An array of LEDs or laser diodes 62 (one only shown here) are offset from the optic axis behind a window 64 in the housing 52. These LEDs are oriented to project light at a low angle onto the bar code symbol 12. Here, there is a single array 62 on one side of the optic axis, but there may be more than one such array, and illumination may be incident from more than one side. A connector 66 connects to other equipment and serves to input power to the scanner and to output decoded bar code information.

While the invention has been described and illustrated in respect to a few selected preferred embodiments, it should be appreciated that the invention is not limited only to those precise embodiments. Rather, many modifications and variations would present themselves to those of skill in the art without departing from the scope and spirit of this invention, as defined in the appended claims.

We claim:

1. An optical symbol scanner assembly for detecting and decoding a symbol lying on a surface of an article, comprising a scanner device having a distal face on which is positioned a light-generating means for producing illumination to fall on said symbol, and focusing means for focusing an image of said symbol on an imager device positioned proximally thereof in said scanner device, said focusing means defining an optic axis; and an illumination assembly adapted to be mounted on the distal face of said scanner device, including a lens barrel member having an optic axis aligned with the optic axis of said scanning device, and at least one light pipe having a flat proximal face to receive illumination from said light-generating means and an angulated distal face for projecting said illumination at a low angle relative to the surface of the article when said surface is disposed substantially at a right angle to said optic axis, such that when a distal end of said illumination assembly is positioned in contact with said article, the illumination impinges on said symbol with an axis thereof at a low angle in a range of about 10 to 18 degrees relative to the surface of said article with said optic axis thereof substantially normal to the surface of said article.

2. An optical symbol scanner assembly according to claim 1 wherein said lens barrel member includes an auxiliary focusing lens.

3. An optical symbol scanner assembly according to claim 1 wherein said at least one light pipe includes a pair of said light pipes disposed on opposite sides of said lens barrel member and parallel thereto.

4. An optical symbol scanner assembly according to claim 3 wherein each said light pipe is in the form of a transparent solid member having a flat proximal side disposed against said distal face of said scanner device, an inward side rising from said proximal side and facing toward the optic axis, and an outward side rising from the distal face of the scanner device and having a distal portion that is angulated to meet the inner side thereof at a distal tip.

5. An optical symbol scanner assembly according to claim 4 wherein said outward side has a tapered central portion between said proximal face and said distal portion.

6. An optical symbol scanner assembly according to claim 4 wherein said solid transparent member is formed of a clear acrylic.

7. An optical symbol scanner assembly according to claim 4 wherein said transparent solid member outward side is tapered so as to have an angulated middle portion and an angulated tip portion, said tip portion being angled at about 40 degrees and said middle portion being angled at an angle smaller than 40 degrees.

8. An optical symbol scanner assembly according to claim 4 wherein said transparent solid member further has a front to back taper from the proximal side to its distal tip.

9. An optical symbol scanner assembly for detecting and decoding a symbol lying on a surface of an article, comprising a scanner device having a distal face on which is positioned a light-generating means for producing illumination to fall on said symbol, and focusing means for focusing an image of said symbol on an imager device positioned proximally thereof in said scanner device, said focusing means defining an optic axis; and an illumination assembly adapted to be mounted on the distal face of said scanner device, including a lens barrel member having an optic axis aligned with the optic axis of said scanning device, and at least one light pipe having a flat proximal face to receive illumination from said light-generating means and an angulated distal face for projecting said illumination at a low angle relative to the surface of said article when disposed substantially at a right angle to said optic axis, such that when a distal end of said illumination assembly is positioned in contact with said article, the illumination impinges on said symbol with an axis thereof at said low angle, wherein each said light pipe is in the form of a transparent solid member having a flat proximal side disposed against said distal face of said scanner device, an inward side rising from said proximal side and facing toward the optic axis, and an outward side having a distal portion that forms an apex angle with respect to said inner side, and wherein the apex angle at said distal portion of said outward side of said transparent solid member is substantially 40 degrees, so that said illumination reflected from said distal portion exits said inward side at said low angle.

10. An optical symbol scanner assembly for detecting and decoding a two-dimensional optical symbol lying on a surface of an article, comprising a housing;

a scanner device within said housing including an imager device and focusing means for focusing an image of said optical symbol on said imager device, said focusing means defining a scanner optic axis; and an illumination arrangement mounted in said housing at one or more sides of said optic axis and having an illumination direction that is angulated to project light therefrom at a low angle relative to the surface of said article when disposed at a right angle to said optic axis, such that when said article is at a predetermined position on said optic axis, the light of said illumination impinges on said optical symbol with a principal axis thereof at a low angle of between about 10 and 18 degrees relative to the surface of said article with said scanner optic axis substantially normal to the surface of said article.

11. An optical symbol scanner assembly according to claim 10 wherein said illumination arrangement includes an array of LEDs mounted at a distal face of said housing and spaced from said optic axis.

12. An optical symbol scanner assembly according to claim 11 wherein said LEDs are laser diodes.

13. An optical symbol scanner assembly according to claim 10 wherein said housing is fixedly disposed relative to a conveyor on which coded articles move past for identification.

14. An optical symbol scanner assembly for detecting and decoding a symbol lying on a surface of an article, comprising a scanner device having a distal face on which is positioned a light-generating means for producing illumination to fall on said symbol, and focusing means for focusing an image of said symbol on an imager device positioned proximally thereof in said scanner device, said focusing means defining an optic axis; and an illumination assembly adapted to be mounted as an attachment externally onto the distal face of said scanner device, including a lens barrel member having an optic axis aligned with the optic axis of said scanning device, and at least one light pipe having a flat proximal face to receive illumination from said light-generating means and an angulated distal face for projecting said illumination at a low angle relative to the surface of said article when disposed at a right angle to said optic axis, with a distal end of the illumination assembly projecting in front of said scanning device such that said distal end can be positioned in contact with said article, and said angulated distal face of said at least one light pipe being at an angle such that the illumination reflected therefrom exits said light pipe and impinges on said symbol at said low angle relative to the surface of said article.

15. The optical symbol scanner assembly according to claim 14, wherein said low angle is in the range of 10 to 18 degrees.

16. The optical symbol scanner assembly according to claim 14, wherein there are two of said light pipes disposed on opposite sides of said lens barrel member and define an open space between the light pipes distally of the lens barrel member to accommodate said article therein.

17. The optical symbol scanner assembly according to claim 14, further comprising means for mechanically securing said illumination assembly onto the distal face of said scanner.

* * * * *

(12) EX PARTE REEXAMINATION CERTIFICATE (7343rd)
United States Patent
Hattersley et al.

(10) Number: US 6,352,204 C1
(45) Certificate Issued: Feb. 2, 2010

(54) OPTICAL SYMBOL SCANNER WITH LOW ANGLE ILLUMINATION

(75) Inventors: John R. Hattersley, Skaneateles, NY (US); Francis O. Blackwell, III, Auburn, NY (US)

(73) Assignee: Microscan Systems, Inc., Renton, WA (US)

Reexamination Request:
No. 90/009,190, Jul. 9, 2008

Reexamination Certificate for:
Patent No.: 6,352,204
Issued: Mar. 5, 2002
Appl. No.: 09/366,414
Filed: Aug. 4, 1999

(51) Int. Cl.
*G06K 7/10* (2006.01)

(52) U.S. Cl. .................................. 235/472.01; 235/454
(58) Field of Classification Search .................. None
See application file for complete search history.

(56) References Cited

U.S. PATENT DOCUMENTS

| | | | |
|---|---|---|---|
| 2,357,378 A | 9/1944 | Benford | |
| 3,857,626 A | 12/1974 | Rosenberger et al. | |
| 4,475,796 A | 10/1984 | Kimura | |
| 4,626,079 A | 12/1986 | Nakamura et al. | |
| 4,767,172 A | 8/1988 | Nichols et al. | |
| 4,768,133 A | 8/1988 | Simons et al. | |
| 4,930,872 A | 6/1990 | Convery | |
| 4,969,037 A | 11/1990 | Poleschinski et al. | |
| 5,161,874 A | 11/1992 | Benes | |
| 5,191,199 A | 3/1993 | Elko | 235/483 |
| 5,227,642 A | 7/1993 | Shimizu | |
| 5,274,228 A | 12/1993 | Kaplan | |
| 5,331,176 A | 7/1994 | Sant' Anselmo et al. | |
| 5,332,892 A | 7/1994 | Li et al. | |
| 5,349,172 A | 9/1994 | Roustaei | |
| 5,349,210 A | 9/1994 | Ackley et al. | |
| 5,354,977 A | 10/1994 | Roustaei | |
| 5,362,953 A | 11/1994 | McKenna et al. | |
| 5,378,883 A | 1/1995 | Batterman et al. | |
| 5,408,084 A | 4/1995 | Brandorff et al. | |
| 5,497,267 A | 3/1996 | Ishikawa et al. | |

(Continued)

FOREIGN PATENT DOCUMENTS

| | | |
|---|---|---|
| DE | 3100662 A1 | 11/1981 |
| EP | 0185782 A1 | 7/1986 |
| JP | 58-28712 | 2/1983 |
| JP | 61-270720 | 12/1986 |
| WO | WO 99/49347 | 9/1999 |

OTHER PUBLICATIONS

Wolfson, Richard and Pasachoff, Jay M. *Physics with Modern Physics.* 2$^{nd}$ Ed. 1995. p. 900–901.*

*Primary Examiner*—Deandra M Hughes

(57) ABSTRACT

An optical symbol scanner assembly includes an illumination assembly to facilitate detection and decoding small 2-D matrix bar code symbols or other optically read symbols that are laser etched or printed on the surface of microelectronics modules or other small articles. A hand-held scanner has an array of LEDs or laser diodes on its distal face that produces light to illuminate the symbol. There is also a focussing lens on the distal face and an imager device positioned behind the lens. The illumination assembly is mounted on the distal face of the scanner device. In this assembly, a lens barrel member has an optic axis aligned with the optic axis of the scanner, and a light pipe is positioned adjacent the lens barrel member. The light pipe has a flat proximal face against the array of LEDs, and an angulated distal face for projecting the illumination at a sharp angle relative to the optic axis. The tip of the illumination assembly is in near contact with the article to read the symbol. The lens barrel member may carry an auxiliary lens. Preferably, there is a pair of light pipes disposed on opposite sides of said lens barrel member. Alternatively, the scanner may be configured as a fixed device, for reading symbols on articles that flow past it without contact.

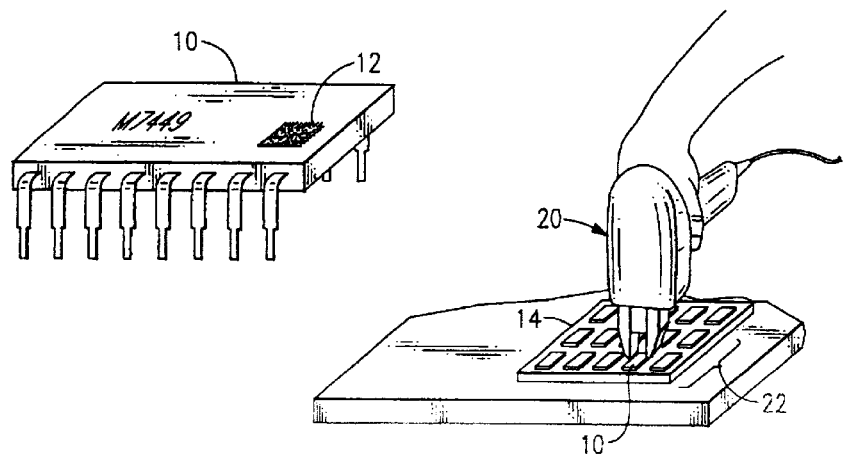

U.S. PATENT DOCUMENTS

| | | | |
|---|---|---|---|
| 5,506,663 A | 4/1996 | Ulrich et al. | |
| 5,506,929 A | 4/1996 | Tai et al. | |
| 5,508,504 A | 4/1996 | Dvorkis et al. | |
| 5,515,452 A | 5/1996 | Penkethman et al. | 382/141 |
| 5,517,018 A | 5/1996 | Zheng et al. | |
| 5,532,467 A | 7/1996 | Roustaei | |
| 5,539,485 A | 7/1996 | White | |
| 5,550,362 A | 8/1996 | Sherman | |
| 5,567,934 A | 10/1996 | Zheng et al. | |
| 5,574,804 A | 11/1996 | Olschafskie et al. | |
| 5,584,558 A | 12/1996 | Nath | |
| 5,690,417 A | 11/1997 | Polidor et al. | |
| 5,697,699 A | 12/1997 | Seo et al. | |
| 5,907,148 A | 5/1999 | Iwafuchi et al. | |
| 5,945,661 A | 8/1999 | Nukui et al. | |
| 6,022,124 A | 2/2000 | Bourne et al. | 362/247 |
| 6,033,090 A * | 3/2000 | Seo | 362/252 |
| 6,181,471 B1 | 1/2001 | Miyoshi | 359/388 |

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 is confirmed.

Claim 14 is determined to be patentable as amended.

Claims 15–17, dependent on an amended claim, are determined to be patentable.

New claims 18–30 are added and determined to be patentable.

14. An optical symbol scanner assembly for detecting and decoding a symbol lying on a surface of an article, comprising
 a scanner device having a distal face on which is positioned a light-generating means for producing illumination to fall on said symbol, and focusing means for focusing an image of said symbol on an imager device positioned proximally thereof in said scanner device, said focusing means defining an optic axis; and
 an illumination assembly adapted to be mounted as an attachment externally onto the distal face of said scanner device, including a lens barrel member having an optic axis aligned with the optic axis of said scanning device, and at least one light pipe having a flat proximal face to receive illumination from said light-generating means and *a tapered distal end that forms* an angulated distal face for projecting said illumination at a low angle relative to the surface of said article when disposed at a right angle to said optic axis, with [a] *the* distal end of the illumination assembly projecting in front of said scanning device such that said distal end can be positioned in contact with said article, and said angulated distal face of said at least one light pipe being at an angle such that the illumination reflected therefrom exits said light pipe and impinges on said symbol at said low angle relative to the surface of said article.

*18. An optical symbol scanner assembly for detecting and decoding a symbol on a surface of an article, the scanner assembly comprising:*
 *a scanner having a distal face on which are positioned:*
  *a light-generating means for producing illumination to fall on the symbol, and*
  *focusing means for focusing an image of the symbol on an imager device positioned proximally thereof in the scanner device, the focusing means defining an optic axis; and*
 *an illumination assembly adapted to be mounted on the distal face of the scanner device, including:*
  *a lens barrel member having an optic axis aligned with the optic axis of the scanning device, and*
  *a pair of light pipes disposed on opposite sides of the lens barrel member and parallel thereto, each light pipe comprising a transparent solid member having a flat proximal face disposed against the distal face of the scanner device to receive illumination from the light generating means, wherein the transparent solid member includes an inward side rising from the proximal side and facing toward the optic axis and an outward side rising from the distal face of the scanner device and having a distal portion that is angulated to meet the inner side thereof at a distal tip, wherein the outward side is tapered so as to have an angulated middle portion and an angulated tip portion, the tip portion being angled at about 40 degrees and the middle portion being angled at an angle smaller than 40 degrees such that when a distal end of the illumination assembly is positioned in contact with the article, the illumination impinges on the symbol with an axis thereof at a low angle in a range of about 10 to 18 degrees relative to the surface of the article with the optic axis thereof substantially normal to the surface of the article.*

*19. The optical symbol scanner assembly of claim 18 wherein the lens barrel member includes an auxiliary focusing lens.*

*20. The optical symbol scanner assembly of claim 18 wherein the light pipes are bonded to the lens barrel member.*

*21. An optical symbol scanner assembly for detecting and decoding a symbol lying on a surface of an article, comprising*
 *a scanner device having a distal face on which is positioned a light-generating means for producing illumination to fall on said symbol, and focusing means for focusing an image of said symbol on an imager device positioned proximally thereof in said scanner device, said focusing means defining an optic axis; and*
 *an illumination assembly adapted to be mounted on the distal face of said scanner device, including a lens barrel member having an optic axis aligned with the optic axis of said scanning device, and at least one light pipe having a flat proximal face to receive illumination from said light-generating means and an angulated distal face for projecting said illumination at a low angle relative to the surface of the article, such that when a distal end of said illumination assembly is positioned in contact with said article, the illumination impinges on said symbol with an axis thereof at a low angle in a range from about 10 to less than 15 degrees relative to the surface of said article with said optic axis thereof substantially normal to the surface of said article.*

*22. An optical symbol scanner assembly according to claim 21 wherein said lens barrel member includes an auxiliary focusing lens.*

*23. An optical symbol scanner assembly according to claim 21 wherein said at least one light pipe includes a pair of said light pipes disposed on opposite sides of said lens barrel member and parallel thereto.*

*24. An optical symbol scanner assembly according to claim 23 wherein each said light pipe is in the form of a transparent solid member having a flat proximal side disposed against said distal face of said scanner device, an inward side rising from said proximal side and facing toward the optic axis, and an outward side rising from the distal face of the scanner device and having a distal portion that is angulated to meet the inner side thereof at a distal tip.*

*25. An optical symbol scanner assembly according to claim 24 wherein said outward side has a tapered central portion between said proximal face and said distal portion.*

26. An optical symbol scanner assembly according to claim 24 wherein said solid transparent member is formed of a clear acrylic.

27. An optical symbol scanner assembly according to claim 24 wherein said transparent solid member outward side is tapered so as to have an angulated middle portion and an angulated tip portion, said tip portion being angled at about 40 degrees and said middle portion being angled at an angle smaller than 40 degrees.

28. An optical symbol scanner assembly according to claim 24 wherein said transparent solid member further has a front to back taper from the proximal side to its distal tip.

29. An optical symbol scanner assembly for detecting and decoding a symbol on a surface of an article, the scanner assembly comprising:

a scanner having a distal face on which are positioned:
　　a light-generating means for producing illumination to fall on the symbol, and
　　optics for focusing an image of the symbol on an imager positioned in the scanner device, the focusing means defining an optic axis; and
　an illumination assembly adapted to be mounted on the distal face of the scanner device, including:
　　a lens barrel member having an optic axis aligned with the optic axis of the scanning device, and
　　at least one double-angulated light pipe comprising a flat proximal end to receive illumination from the light-generating means, an angulated middle portion, and an angulated tip portion that forms an angulated distal face at a distal end, such that when the distal end of the illumination assembly is positioned in contact with the article, the illumination impinges on the symbol at a low angle in a range of about 10 to 18 degrees relative to the surface of the article with the optic axis thereof substantially normal to the surface of the article.

30. The optical symbol scanner assembly of claim 29 wherein the angle of the angulated middle portion with respect to an inward side of the light pipe is different than the angle of the angulated tip portion with respect to an inward side.

\* \* \* \* \*